W. F. KETCHUM.
Grass and Grain Cutting Machine.
No. 3,033. Reissued July 14, 1868.
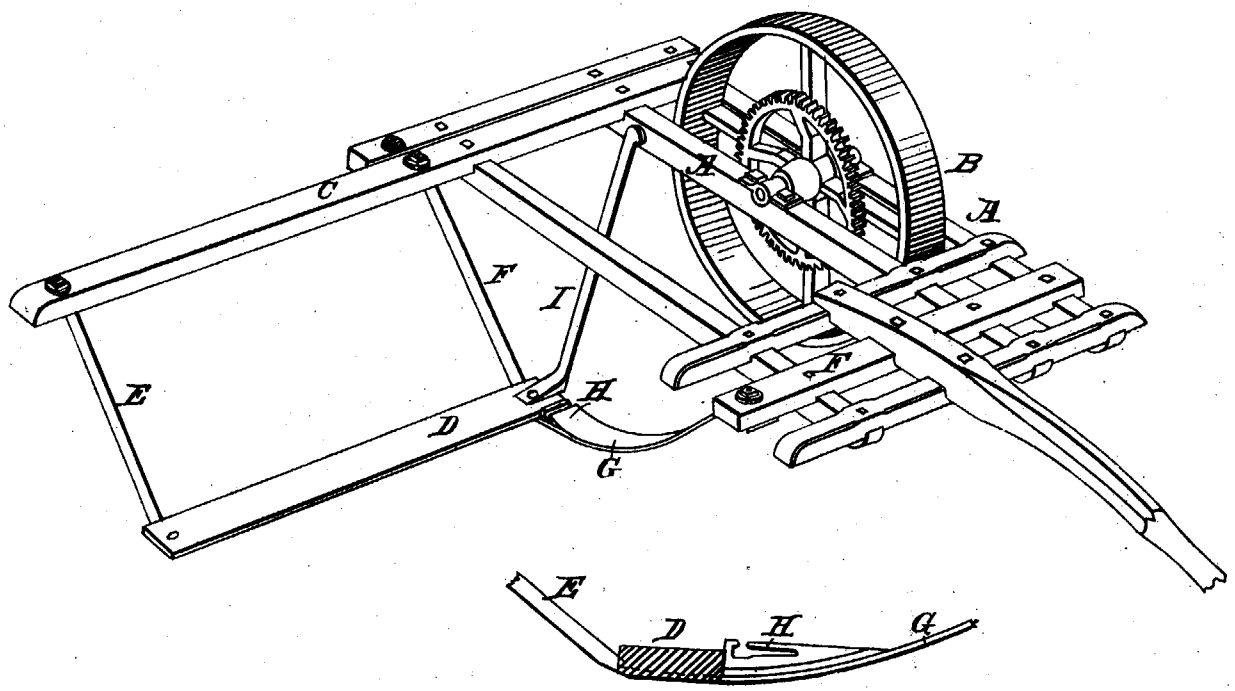
N. PETERS, Photo-Lithographer, Washington, D. C.

UNITED STATES PATENT OFFICE.

LOUISA R. KETCHUM, OF BUFFALO, NEW YORK, EXECUTRIX OF THE ESTATE OF WILLIAM F. KETCHUM, DECEASED.

IMPROVEMENT IN GRASS AND GRAIN CUTTING MACHINES.

Specification forming part of Letters Patent No. 8,724, dated February 10, 1852; Reissue No. 259, dated February 28, 1854; Reissue No. 466, dated June 2, 1857; extended 7 years; Reissue No. 3,033, dated July 4, 1868.

*To all whom it may concern:*

Be it known that WILLIAM F. KETCHUM, of the city of Buffalo, in the county of Erie and State of New York, deceased, in his life-time invented new and useful Improvements in Grass and Grain Cutting Machines, of which the following is a full and accurate description, reference being had to the accompanying drawings and the letters of reference marked thereon.

The said improvements consist in a new and useful mode of supporting the rack or finger-bar near the ground, at the side of the main frame or wheel and opposite thereto; or it may be a little in front or rear of said frame and wheel and opposite the plane of the same, while the main frame or supports of the wheel are nearly horizontal in the line of draft at such height as to accommodate a large wheel, avoid clogging, &c.; also, in a new and useful mode of carrying the heel of the rack or finger-bar over the cut grass, and also in communicating the draft directly thereto to prevent leverage, lateral strain, &c., by means of an extended shoe, as will be presently described.

The main frame consists of two strong longitudinal bars united together at each end by cross-bars firmly bolted thereto. This frame is supported by a wheel, say, three or four feet in diameter, placed in the space between the longitudinal and cross bars, the ends of whose axle enter into boxes on the longitudinal bars. This is the main wheel of the machine, upon which, mainly, it travels, and may be so geared with the cutter as to vibrate it by the revolution of the wheel in traveling. The rack or finger-bar which supports the cutter is placed in a horizontal position at the side of the main frame and nearly perpendicular thereto, but much nearer the ground, in order to cut sufficiently close. The inner end of this rack or finger-bar, which is at the inner end of the cutter, may be nearer to or farther from the wheel; but it is better to place it, as shown in the drawing, several feet therefrom, as in that position it works much better in actual use. It may be also placed farther forward or farther back than represented in the drawing; but it is better to be placed, as represented, nearly in the same vertical plane with the axis, as this position has many advantages over any other; but the improvements herein described are alike applicable to these changes of position. The cross-bar in front should be extended out on the side next the center bar for the reception of the rear end of the tongue or shaft by which the machine is drawn and guided; and they should be halved and bolted or otherwise firmly fixed together, so that the tongue cannot have any lateral motion without communicating it to the machine. The position of the tongue laterally should depend upon the distance of the heel of the cutter from the main wheel, in order to equalize the draft or diminish the side draft when the machine is in operation.

To give support to the rack or finger-bar D, one of the cross-bars of the frame is extended outward behind the rack or finger-bar, and downward therefrom arms or braces E E are extended to the finger-bar, and they are so connected with the cross-bar and finger-bar as to preserve their relative positions, as fully shown in the drawing.

What is called a "shoe," H G, is placed so as to incline upward as it extends forward to enable the heel of the rack or finger-bar and the heel of the cutter to slide or pass over obstructions and over the mown grass which may lie in its path, and also to keep the grass out of the opening through which the heel of the cutter slides. This shoe is extended upward and forward to the front part of the frame and bolted firmly thereto. At the same time, therefore, that the shoe thus extended enables the heel of the finger-bar to slide over obstructions, it gives support to the heel of the finger-bar and communicates the draft directly thereto; but it is easy to see that by giving additional strength to some of the parts the extension of the shoe, so as to communicate the draft thereto, and also other parts of the supports, might be dispensed with.

By giving very firm support to the rack or finger-bar at the heel and making it heavier and stiffer the support at the outer end might be omitted, and consequently the outer part of the cross-bar C. The brace E at the heel might also be omitted, and also the whole extension of the rear cross-bar, by giving strength enough to the extended shoe and arm or brace I; and it may be further remarked that the support for the finger-bar from the rear might be made so strong as to dispense with any support from the continuation of the shoe.

Having thus described said improvements, the following is claimed, viz:

1. Extending the shoe H G from the heel of the rack or finger-bar upward and forward and firmly connecting its continuation with the draft where the finger-bar is located, as set forth, so that the power by which the machine is drawn shall, through the shoe, be communicated to and draw forward the heel of the rack or finger-bar, thus relieving the great strain which would otherwise come upon the lateral connections of the rack or finger-bar with the wheel-frame, while the heel is enabled to slide over obstacles or obstructions, substantially as shown.

2. When the main wheel and inner end of the short finger-bar or rack D are located relatively to the frame, substantially as described, projecting the shoe H G, which supports the inner or heel end of said bar, forward and upward from the said heel to a point in advance of the cutters and above the plane thereof sufficiently far to keep the grass down and prevent it rising over the shoe, thus aiding the shoe to ride over the mown grass or other obstructions, substantially as shown.

LOUISA R. KETCHUM.

Witnesses:
H. U. SOPER,
JAMES MOONEY.